US007972112B2

(12) United States Patent
Melius

(10) Patent No.: US 7,972,112 B2
(45) Date of Patent: Jul. 5, 2011

(54) SYSTEMS AND METHODS FOR DETERMINING THE ANGULAR POSITION OF A WIND TURBINE ROTOR

(75) Inventor: Jeffrey Alan Melius, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/608,343

(22) Filed: Oct. 29, 2009

(65) Prior Publication Data

US 2010/0135800 A1    Jun. 3, 2010

(51) Int. Cl.
*F03D 3/06* (2006.01)
(52) U.S. Cl. ............................................ 416/44; 416/61
(58) Field of Classification Search ............... 416/35, 416/44, 61
See application file for complete search history.

(56) References Cited

U.S. PATENT DOCUMENTS

| 7,160,083 | B2 | 1/2007 | Pierce et al. |
| 2006/0140761 | A1 | 6/2006 | LeMieux |
| 2009/0047130 | A1 | 2/2009 | Egedal |

FOREIGN PATENT DOCUMENTS

| EP | 2000665 A2 * | 12/2008 |
| WO | 2009001310 A1 | 12/2008 |

* cited by examiner

*Primary Examiner* — Edward K. Look
*Assistant Examiner* — Dwayne J White
(74) *Attorney, Agent, or Firm* — Sutherland Asbill & Brennan LLP

(57) ABSTRACT

Certain embodiments of the invention may include systems and methods for determining an angular position of a wind turbine rotor. According to an exemplary embodiment of the invention, the method for determining an angular position of a wind turbine may include measuring tangential acceleration and radial acceleration of the rotor, measuring speed of the rotor, determining rotational tangential acceleration of the rotor based at least in part on the change of rotor speed over time, determining rotational radial acceleration based at least in part on the rotor speed, adjusting the measured tangential acceleration based at least in part on the determined rotational tangential acceleration, adjusting the measured radial acceleration based at least in part on the determined rotational radial acceleration, and determining an angular position of the rotor based at least on the adjusted tangential acceleration and the adjusted radial acceleration.

20 Claims, 3 Drawing Sheets

SYSTEMS AND METHODS FOR DETERMINING THE ANGULAR POSITION OF A WIND TURBINE ROTOR

FIELD OF THE INVENTION

This invention generally relates to systems and methods for determining the angular position of a wind turbine rotor.

BACKGROUND OF THE INVENTION

It is known that electrical power can be harvested from wind energy using wind turbines. Control of the turbine blade pitch is often utilized for creating optimum turbine loading conditions in order to harvest the wind energy with the highest possible efficiency. One concern that the operators of the turbines face is that fluctuating and non-uniform wind conditions can fatigue and damage components associated with the turbine, including the main shaft, the tower, and the rotor blades. Asymmetrical loading across the rotors (for example, due to wind shear, turbulence, and yaw misalignment) can create non-uniform load distributions on the blades of the rotor which may in turn reduce the power conversion efficiency or even lead to costly damages of the turbine components. It is therefore necessary to control the pitch of the turbine blades to keep the wind load on each blade within safe operational limits while maximizing the wind power conversion. To address these issues, systems and methods are needed for controlling the turbine blade pitch based on the angular position of the turbine rotor.

Previous systems have been proposed for determining the phase angle of the rotor by the use of an absolute encoder placed at the end of the rotor slip ring. However, if the rotor tower top is bending and moving, measurement errors may be introduced due to differences in the frame of reference between the encoder and the turbine rotor. Other systems have been proposed where three one-dimensional accelerometers are fixed to the rotor and placed at equidistant angles around the rotation axis of the rotor for removal of the tangential acceleration components. However, such systems require additional mounting, precise positioning, and additional wiring for the three accelerometers.

A need remains for improved systems and methods for determining the angular position of a wind turbine rotor.

BRIEF SUMMARY OF THE INVENTION

Some or all of the above needs may be addressed by certain embodiments of the invention. Certain embodiments of the invention may include systems and methods for determining an angular position of a wind turbine rotor.

According to an exemplary embodiment of the invention, a method for determining an angular position of a wind turbine rotor is provided. The method may include measuring tangential acceleration (At) and radial acceleration (Ar) of the rotor, measuring speed of the rotor, determining rotational tangential acceleration (cAt) of the rotor based at least in part on the change of rotor speed over time, determining rotational radial acceleration (cAr) based at least in part on the rotor speed, adjusting the measured tangential acceleration (At) based at least in part on the determined rotational tangential acceleration (cAt), adjusting the measured radial acceleration (Ar) based at least in part on the determined rotational radial acceleration (cAr), and determining an angular position of the rotor based at least on the adjusted tangential acceleration (aAt) and the adjusted radial acceleration (aAr).

According to another exemplary embodiment, a system for determining an angular position of a wind turbine rotor may be provided. The system may include at least one accelerometer operable to measure tangential acceleration (At) and radial acceleration (Ar) at one or more measurement positions on the rotor, a shaft encoder operable to measure rotor speed, and one or more processors. The one or more processors may be operable to determine rotational tangential acceleration (cAt) of the rotor at the one or more measurement positions based at least in part on the change of rotor speed over time, determine rotor rotational radial acceleration (cAr) based at least in part on the rotor speed, adjust the measured tangential acceleration (At) with the determined rotational tangential acceleration (cAt), adjust the measured radial acceleration (Ar) with the determined rotational radial acceleration (cAr), and determine an angular position of the rotor based at least on the adjusted tangential acceleration (aAt) and the adjusted radial acceleration (aAr).

According to another exemplary embodiment, a wind turbine may be provided. The wind turbine may include a rotor comprising one or more blades, at least one shaft in communication with the rotor, a shaft encoder in communication with the shaft, and a wind turbine control system. The wind turbine control system may include at least one accelerometer mounted to the rotor, and one or more processors. The at least one accelerometer is operable to measure tangential acceleration and radial acceleration at one or more measurement positions on the rotor, and the shaft encoder is operable to measure the speed of the rotor. The one or more processors are operable to: determine rotational tangential acceleration of the rotor at the one or more measurement positions based at least in part on the change of rotor speed over time, determine rotational radial acceleration based at least in part on the rotor speed, adjust the measured tangential acceleration with the determined rotational tangential acceleration, adjust the measured radial acceleration with the determined rotational radial acceleration, and determine an angular position of the rotor based at least on the adjusted tangential acceleration and the adjusted radial acceleration.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable an angular position of a wind turbine rotor to be determined. Certain embodiments of the invention may enable the rotor blade positions to be determined based on the angular position of the wind turbine rotor. According to certain exemplary embodiments, the angular position of the wind turbine rotor may be determined by measuring the tangential and radial acceleration at one or more locations on the rotor, and by measuring the speed of the rotor. According to certain embodiments, the rotor angular speed and acceleration may be measured using a rotary encoder on the rotor shaft, either before or after gearing. The rotor speed and acceleration measurement may be utilized to adjust or otherwise compensate the measured acceleration measurements to factor out calculated vector components that may be based on the speed and acceleration measurement, including centripetal and angular acceleration components. According to an exemplary embodiment, the gravity vector may be determined by subtracting the calculated centripetal acceleration component from the measured radial acceleration vector, and by subtracting the calculated angular acceleration component from the measured tangential component vector. According to certain exemplary embodiments, the acceleration measurements may be performed using one or more accelerometers. According to certain exemplary embodiments, a single, two-axis accelerometer may be utilized to measure the tangential and radial accelerations.

Various systems and methods for determining the angular position of a wind turbine rotor, according to embodiments of the invention, will now be described with reference to the accompanying figures.

Figure 1:
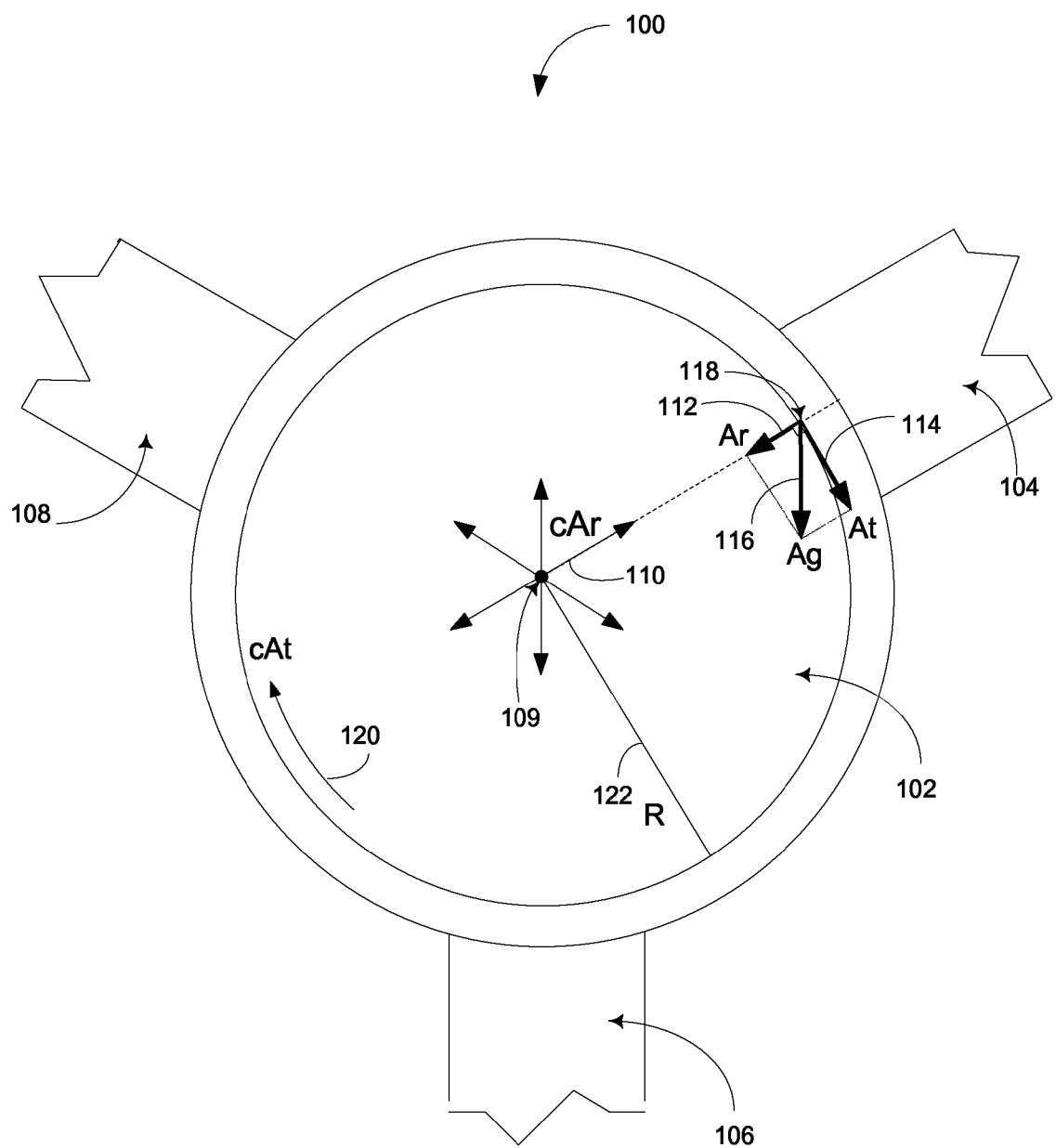
FIG. 1 is a diagram of an illustrative turbine rotor according to an exemplary embodiment of the invention.

FIG. 1 illustrates a portion of a wind turbine 100 according to an exemplary embodiment of the invention. The wind turbine may include a rotor 102 and one or more rotor blades 104, 106, 108 which may be suspended in a rotor hub (not shown). The wind turbine 100, including the rotor 102 and the blades 104, 106, 108 may rotate about an axis 109, and the rotation may give rise to certain acceleration components that can be measured directly or calculated based on measurements.

According to exemplary embodiments of the invention, an accelerometer 118 may be placed on or attached to a wind turbine rotor near the junction of a wind turbine blade, at a distance (R) 122 from the rotor axis 109. According to an exemplary embodiment, the accelerometer 118 may be operational to measure acceleration along two axes, where the axes may be orthogonal, or separated by 90 degrees so that the contributions of the various acceleration vectors may be separable.

According to an exemplary embodiment, the wind turbine rotor 102 may rotate at a rotational velocity=ω, and this rotational velocity may be measured with an encoder, tachometer, or similar device in communication with a shaft or other rotating at a speed proportional to the rotor speed. Based on the radius 122 (R) offset position of the accelerometer from the rotor axis 109, and on the rotational velocity ω, a rotational radial acceleration 110 (cAr) may be calculated as $\omega^2 R = cAr$. Furthermore, based on the change in the rotational velocity ω with respect to time, a rotational tangential acceleration 120 (cAt) may be calculated as $R(d\omega/dt) = cAt$.

According to an exemplary embodiment of the invention, an accelerometer may be utilized to measure radial acceleration (Ar) 112 and tangential acceleration (At) 114 of the rotor. A gravity (Ag) 116 vector is always present, and its magnitude can be verified (1 g) when the rotor 102 is stationary by computing the vector sum of the radial acceleration (Ar) 112 and the tangential acceleration (At) 114 components. The angular position of the rotor 102, therefore, may be determined by the equation: arctan(At/Ar). However, when the rotor is rotating, additional rotational acceleration components arise, and according to certain exemplary embodiments of the invention, can be calculated based on measurements and utilized to more accurately determine the angular position of the rotating rotor.

According to exemplary embodiments of the invention, when the rotor 102 is rotating, the calculated or determined rotational radial acceleration (cAr) 110 and the calculated or determined rotational tangential acceleration (cAt) 120 may be utilized, respectively, to adjust or compensate the radial acceleration (Ar) 112 and tangential acceleration (At) 114 to factor out the vector components that arise due to rotor 102 rotation speed and acceleration so that angular position of the rotor 102 may be determined.

Figure 2:
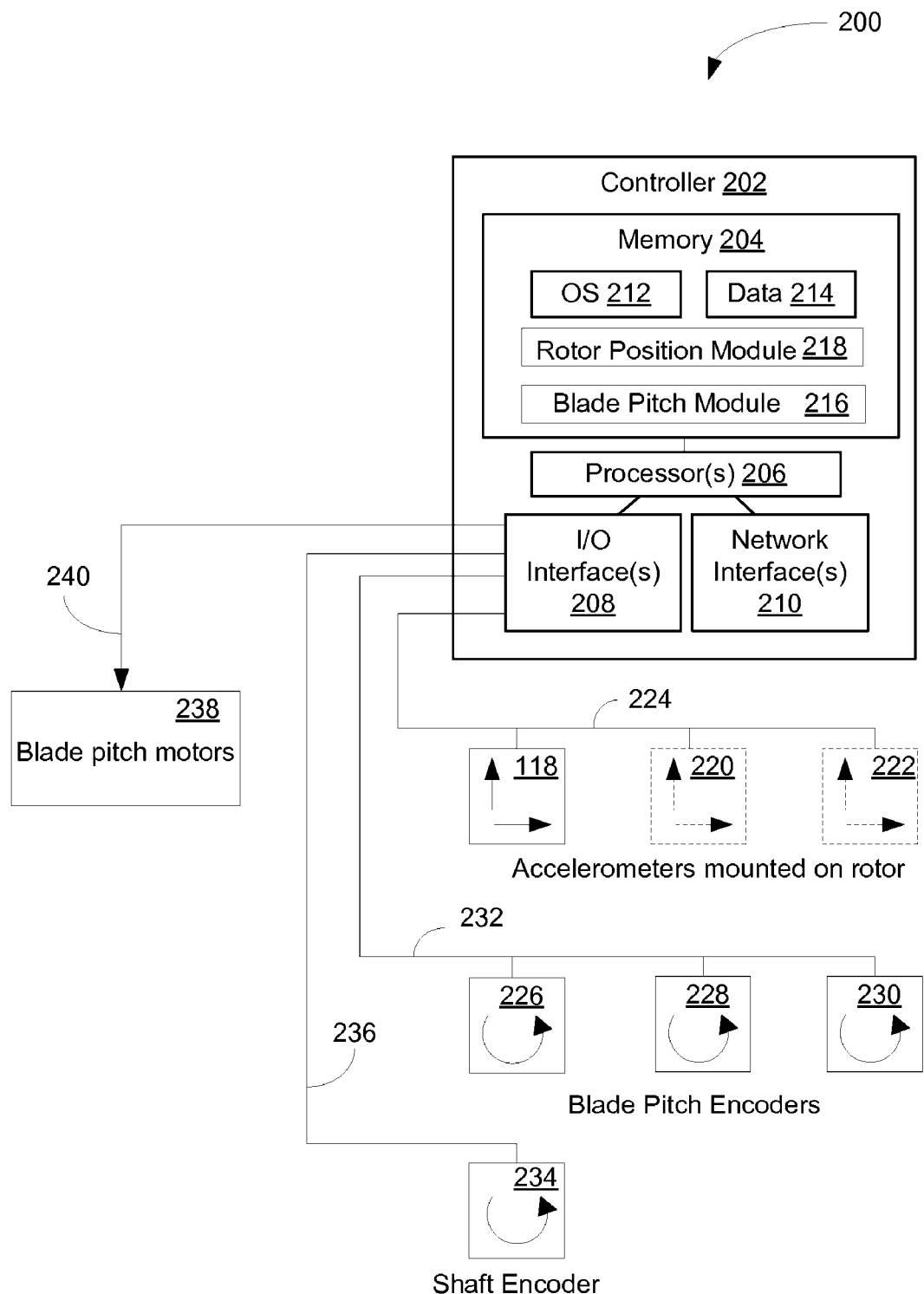
FIG. 2 is a block diagram of an illustrative wind turbine control system, according to an exemplary embodiment of the invention.

FIG. 2 illustrates a wind turbine control system 200. According to exemplary embodiments of the invention, the wind turbine control system 200 may include a controller 202. The controller 202 may include a memory 204, one or more computer processors 206, one or more I/O (input-output) interfaces 208, and one or more network interfaces 210. The processor(s) 206 may be in communication with the memory 204, the I/O interface(s) 208, and the network interface(s) 210. The memory may be operable to store an operating system 212, data 214, a blade pitch module 216, and a rotor position module 218.

According to an exemplary embodiment of the invention, the wind turbine control system 200 may also include an accelerometer 118. According to other exemplary embodiments, additional optional accelerometers 220, 222 may be included and utilized to increase the accuracy of the measurements, and/or to provide redundancy. Accelerometer 118 and optional accelerometers 220, 222 may produce accelerometer signals 224 for input to the processors 206 via the one or more I/O interfaces 208.

According to an exemplary embodiment of the invention, the wind turbine control system 200 may also include a shaft encoder 234. The shaft encoder may measure the rotational speed of the rotor 102. The shaft encoder 234 may be in communication with the rotor shaft or other devices rotating at a speed proportional to the rotor (not shown), either before or after gearing, and may provide an encoder signal 236 for input to the processors 206 via the one or more I/O interfaces 208.

According to an exemplary embodiment of the invention, the wind turbine control system 200 may also include blade pitch encoders 226, 228, 230. The blade pitch encoders may monitor the pitch angle of the rotor blades 104, 106, 108 respectively, and may produce blade pitch encoder signals 232 for input to the processors 206 via the one or more I/O interfaces 208. The blade pitch module 216 may be in communication with the processor 206 to produce blade pitch control signals 240 for controlling to the blade pitch motors 238 based at least in part on the blade pitch encoder signals 232.

According to an exemplary embodiment of the invention, the accelerometer signals 224 and the shaft encoder signals 236 may be processed to determine the angular position of the rotor 102. This information may also be utilized to produce the blade pitch control signals 240 that can be sent to the blade pitch motors 238 via the I/O interface 208 to control the pitch of the rotor blades 104, 106, 108.

Figure 3:
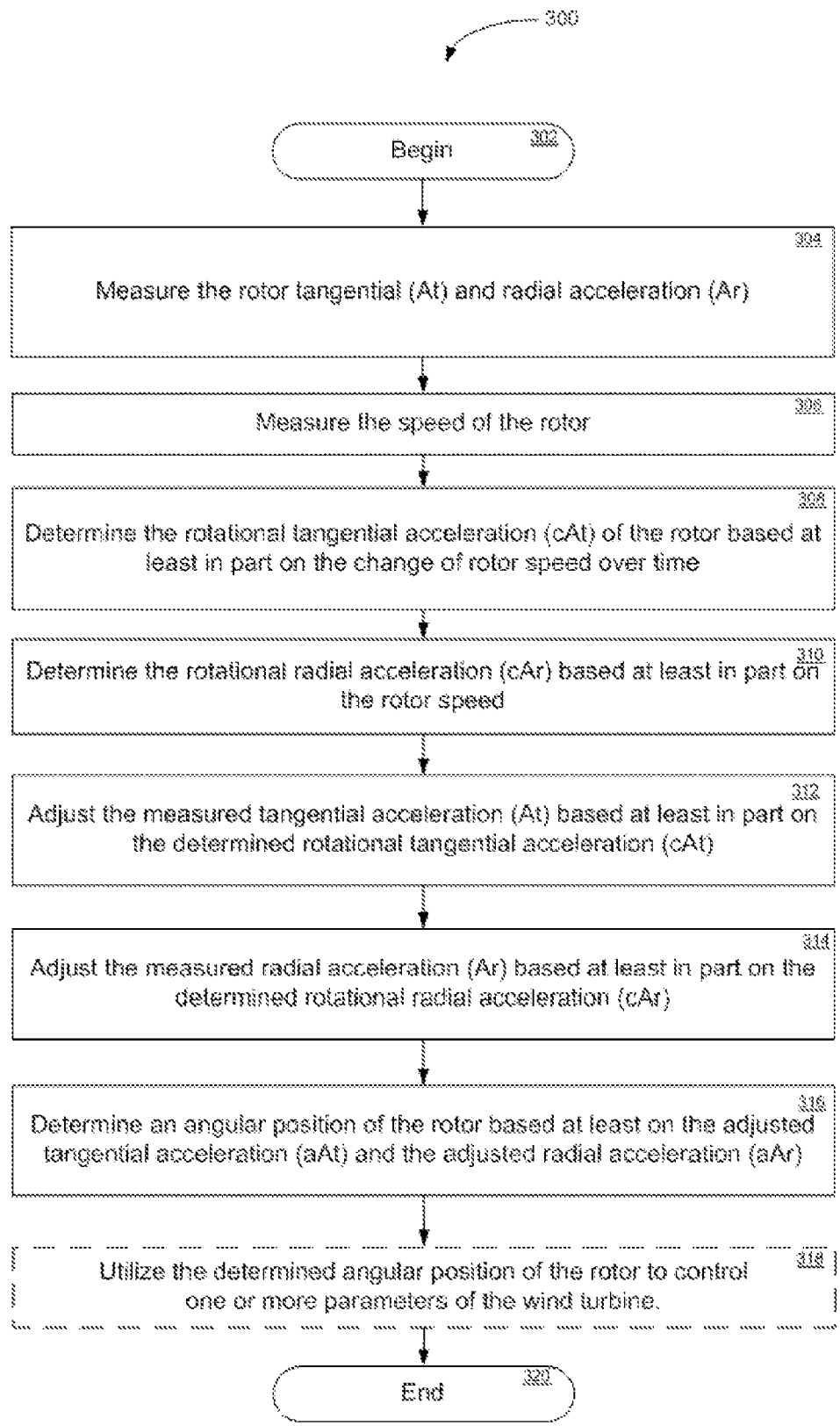
FIG. 3 is a flow diagram of an exemplary method according to an exemplary embodiment of the invention.

An exemplary method 300 for determining the angular position of a wind turbine rotor 102 will now be described with reference to the flowchart of FIG. 3. The method starts in block 302. In block 304 and according to an exemplary embodiment of the invention, an accelerometer 118 may be attached to the rotor 102 at a position offset from the rotational axis 109, and the tangential (At) 114 and radial accelerations (Ar) 112 may be measured. In block 306, and according to an exemplary embodiment, the speed of the rotor is measured. The speed may be measured by an encoder 234 in communication with the rotor shaft, either before or after gearing. The encoder 234 may produce one or more pulse signals with each revolution of the turbine rotor 102. The rotational speed of the rotor 102 may be determined by summing or integrating the encoder pulses over a unit period of time.

In block 308, and according to an exemplary embodiment of the invention, the rotational tangential acceleration (cAt) of the rotor may be determined based at least in part on the change of rotor speed over time.

In block 310, and according to an exemplary embodiment of the invention, the rotor rotational radial acceleration (cAr) may be determined based at least in part on the rotor speed measurement. According to an exemplary embodiment, the rotational radial acceleration (cAr) may be determined by calculating the change in the speed of the rotor per unit period of time.

In block 312, and according to an exemplary embodiment of the invention, the tangential acceleration (At) 114, as measured in block 304, may be adjusted to factor out the measurement contribution due to determined rotational tangential acceleration (cAt). In one embodiment, the determined rotor rotational tangential acceleration (cAt) is subtracted from the tangential acceleration (At) 114 to produce an adjusted tangential acceleration (aAt).

In block 314, and according to an exemplary embodiment of the invention, the radial acceleration (Ar) 112, as measured in block 304, may be adjusted to factor-out the measurement contribution due to the determined rotational radial acceleration (cAr). In one embodiment, an adjusted radial acceleration (aAr) may be determined by subtracting the determined rotational radial acceleration (cAr) (as determined in block 310) from the measured radial acceleration (Ar) 112.

In block 316, and according to an exemplary embodiment of the invention, the angular position of the rotor may be determined based at least in part on the adjusted tangential acceleration (aAt) (from block 312) and the adjusted radial acceleration (aAr) (from block 314). According to an exemplary embodiment, the angular position of the rotor may be determined as the arc tangent of a quantity defined by the adjusted tangential acceleration (aAt) divided by the adjusted radial acceleration (aAr).

In block 318, and according to an exemplary embodiment of the invention, the determined angular position of the rotor 102 may be utilized to control one or more parameters of the wind turbine 100. The method 300 ends in block 320.

According to certain embodiments of the invention, a shaft may be attached to the rotor 102, and the shaft may transfer rotational energy to an electrical generator via a gearing mechanism. The gearing mechanism may be utilized to increase the rotational speed of the shaft in order to meet the rotational speed requirements of the generator rotor. According to exemplary embodiments of the invention, the shaft encoder 234 may be in communication with the wind turbine rotor shaft (rotating at the same speed as the rotor), or it may be in communication with the generator rotor shaft, which may be rotating at a speed proportional to the rotor shaft. The shaft encoder 234 may produce encoder signals 236 that may include one or more pulses per shaft revolution. The rotational velocity ω of the rotor may be calculated by summing or integrating the encoder pulses over a unit period of time. Scaling, smoothing algorithms and/or interpolation techniques may be utilized to improve the accuracy of the calculated rotor 102 speed based on the encoder signals 236.

According to exemplary embodiments of the invention, the radial acceleration (Ar) 112 and tangential acceleration (At) 114 of the rotor 102 may be measured by a multi-axis accelerometer 118, or by two or more single axis accelerometers 118.

As previously mentioned, and according to an exemplary embodiment of the invention, the angular position of the rotor may be determined with the stationary rotor 102. After establishing the angular position of the stationary rotor 102, the angular position of the spinning rotor 102 may be determined by monitoring the encoder signals 236 from the shaft encoder 234, which may provide a pulse train at a frequency proportional to the rotational speed of the rotor 102.

In the case where the rotor 102 is spinning, there will also be additional centripetal and tangential rotational acceleration components that may act to modify the measured radial acceleration (Ar) 112 and tangential acceleration (At) 114 of the rotor 102 measurements. Therefore, in order to determine the angle of the gravity vector (Ag) 116, and hence, the angular position of the rotor 102, the rotor 102 speed and acceleration, as determined from the shaft encoder 234, may used to compensate or adjust the accelerometer 118 readings and provide the angle of the remaining gravity vector (Ag) 116. Therefore, when the rotor 102 is spinning, the angular position of the rotor 102 may be determined by the equation: angular position=arctan((At−cAt)/(Ar−cAr)). According to an exemplary embodiment, signs (+/−) of this computed value may be utilized to determine the quadrant of the rotor 102 position. According to an exemplary embodiment, the magnitude of the gravity vector can be verified to be approximately 1 g via the equation M=square root of $(aAt^2+aAr^2)$, where aAt=At−cAt and aAr=Ar−cAr. This calculation may be used to verify if the system is working properly.

According to exemplary embodiments, the rotor 102 angular position may be estimated by counting, integrating, or interpolating the encoder signal 236 pulses. This estimated angular position may in turn be utilized as an optional partial or full substitute for the angular position determined with the accelerometer 118, particularly in cases where sudden dynamic events cause an excessive amount of noise in the accelerometer signals 224.

According to exemplary embodiments, one or more multi-axis accelerometers 118 may be attached at one or more locations on the rotor 102 to provide redundant measurements, in accordance with any of the embodiments presented. According to another exemplary embodiment, multiple single-axis accelerometers may be utilized instead of a multi-axis accelerometer.

Accordingly, exemplary embodiments of the invention can provide the technical effects of creating certain systems and methods for determining the angular position of a wind turbine rotor. Exemplary embodiments of the invention can provide the further technical effects of providing systems and methods for improving the determination of the angular position of a wind turbine rotor.

In certain embodiments of the invention, the wind turbine 100 and the wind turbine control system 200 may include any number of software applications that are executed to facilitate any of the operations.

In certain embodiments, one or more I/O interfaces may facilitate communication between sensors on the wind turbine 100, speed sensors on an associated rotor shaft, the wind turbine control system 200, and one or more input/output devices. Exemplary input/output devices include accelerometers, incremental encoders, signal conditioners, a universal serial bus port, a serial port, a disk drive, a CD-ROM drive, and/or one or more user interface devices, such as, a display, keyboard, keypad, mouse, control panel, touch screen display, microphone, etc. These devices may facilitate user interaction with the wind turbine control system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the wind turbine control system 200 inputs and outputs to one or more suitable networks and/or connections, for example, the connections that facilitate communications with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the wind turbine 100 system and the wind turbine control system 200 with more or less than the components illustrated in FIGS. 1 and 2.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for determining an angular position of a wind turbine rotor, the method comprising:
    measuring tangential acceleration and radial acceleration of the rotor;
    measuring speed of the rotor with at least one shaft encoder;
    determining rotational tangential acceleration of the rotor based at least in part on the change of rotor speed over time;
    determining rotational radial acceleration based at least in part on the rotor speed;
    adjusting the measured tangential acceleration based at least in part on the determined rotational tangential acceleration;
    adjusting the measured radial acceleration based at least in part on the determined rotational radial acceleration; and,
    determining an angular position of the rotor based at least on the adjusted tangential acceleration and the adjusted radial acceleration.

2. The method of claim 1, further comprising:
    controlling one or more parameters of the wind turbine, based at least in part on the determined angular position of the rotor, wherein the one or more parameters comprise blade pitch, rotor position, and rotor speed.

3. The method of claim 1, wherein measuring tangential acceleration and radial acceleration of the rotor comprises sensing orthogonal axis outputs of a multi-axis accelerometer.

4. The method of claim 1, wherein measuring speed of the rotor comprises sensing pulse outputs of a shaft encoder, wherein the shaft encoder is in communication with a driveshaft that rotates at a speed proportional to the rotational speed of the rotor.

5. The method of claim 1, wherein adjusting the measured tangential acceleration and adjusting the measured radial acceleration is used for determining an angular position of the rotor, and wherein adjusting the measured tangential acceleration (At) comprises subtracting the determined rotational tangential acceleration from the measured tangential acceleration, and wherein adjusting the measured radial acceleration comprises subtracting determined rotational radial acceleration from the measured radial acceleration.

6. The method of claim 5, wherein determining an angular position of the rotor comprises determining the arc tangent of a quantity defined by the adjusted tangential acceleration measurement divided by the adjusted radial acceleration measurement and using the signs (+/−) of the adjusted tangential and adjusted radial acceleration measurements to determine the quadrant of the rotor position.

7. The method of claim 1, wherein determining an angular position of the rotor comprises:
measuring tangential acceleration and radial acceleration of the rotor when it is stationary;
determining angular position of the stationary rotor based at least on the measured tangential acceleration and the radial acceleration;
measuring incremental position of the rotating rotor, wherein measuring incremental position comprises counting pulse outputs of a shaft encoder; and,
determining angular position of the rotating rotor based at least on the acceleration measurements of the stationary rotor and incremental position measurements of the rotating rotor.

8. The method of claim 1, further comprising:
determining the magnitude of a gravity vector based on the adjusted tangential acceleration and the adjusted radial acceleration measurements; and,
validating at least the determined angular position of the rotor by comparing the determined magnitude to an expected magnitude of gravity.

9. The method of claim 1, wherein measuring tangential acceleration and radial acceleration comprises simultaneously measuring tangential acceleration and radial acceleration at two or more measurement positions on the rotor and each pair of measurements at the two or more measurement positions are used to determine redundant rotor positions.

10. A system for determining an angular position of a wind turbine rotor, the system comprising:
at least one accelerometer operable to measure tangential acceleration and radial acceleration at one or more measurement positions on the rotor;
a shaft encoder operable to measure rotor speed;
one or more processors operable to:
determine rotational tangential acceleration of the rotor at the one or more measurement positions based at least in part on the change of rotor speed over time;
determine rotor rotational radial acceleration based at least in part on the rotor speed;
adjust the measured tangential acceleration with the determined rotational tangential acceleration;
adjust the measured radial acceleration with the determined rotational radial acceleration; and,
determine an angular position of the rotor based at least on the adjusted tangential acceleration and the adjusted radial acceleration.

11. The system of claim 10, further comprising:
a wind turbine control system for controlling one or more parameters of the wind turbine, based at least in part on the determined angular position of the rotor, wherein the one or more parameters comprise blade pitch, rotor position, and rotor speed.

12. The system of claim 10, wherein the at least one accelerometer is operable to provide signals proportional to the tangential acceleration and radial acceleration of the rotor by orthogonal axis outputs.

13. The system of claim 10, wherein the shaft encoder is in communication with a driveshaft that rotates at a speed proportional to the rotational speed of the rotor.

14. The system of claim 10, wherein the one or more processors are further operable to:
adjust the measured tangential acceleration by subtracting determined rotational tangential acceleration from the measured tangential acceleration, and,
adjust the measured radial acceleration by subtracting determined rotational radial acceleration from the measured radial acceleration.

15. The system of claim 10, wherein the one or more processors are further operable to:
determine an angular position of the rotor by computing the arc tangent of a quantity defined by the adjusted tangential acceleration measurement divided by the adjusted radial acceleration measurement and using the signs of the adjusted tangential and adjusted radial acceleration measurements to determine the quadrant of the rotor position.

16. The system of claim 10, wherein:
the at least one accelerometer is further operable to measure tangential acceleration and radial acceleration of the rotor when it is stationary;
the one or more processors are further operable to determine angular position of the stationary rotor based at least on the measured tangential acceleration and radial acceleration;
the shaft encoder is operable to provide pulse outputs with a period inversely proportional to the speed of the rotor; and,
the one or more processors are further operable to:
determine an incremental position of the rotating rotor based at least on counting pulse outputs of the shaft encoder; and,
determine an angular position of the rotating rotor based at least on the acceleration measurements of the stationary rotor and incremental position measurements of the rotating rotor.

17. The system of claim 10, wherein the one or more processors are further operable to:
determine the magnitude of a gravity vector based on the adjusted tangential acceleration and the adjusted radial acceleration measurements; and,
validate at least the determined angular position of the rotor by comparing the determined magnitude to an expected magnitude of gravity.

18. The system of claim 10, wherein two or more accelerometers measure the tangential acceleration and radial acceleration at two or more measurement positions on the rotor and each pair of measurements at the two or more measurement positions are used to determine redundant rotor positions.

19. A wind turbine comprising:
a rotor comprising one or more blades;
at least one shaft in communication with the rotor;
a shaft encoder in communication with the shaft;
a wind turbine control system comprising:
   at least one accelerometer mounted to the rotor; and,
   one or more processors;
wherein:
   the at least one accelerometer is operable to measure tangential acceleration and radial acceleration at one or more measurement positions on the rotor;
   the shaft encoder is operable to measure the speed of the rotor;
   the one or more processors are operable to:
      determine rotational tangential acceleration of the rotor at the one or more measurement positions based at least in part on the change of rotor speed over time;
      determine rotational radial acceleration based at least in part on the rotor speed;
      adjust the measured tangential acceleration with the determined rotational tangential acceleration;
      adjust the measured radial acceleration with the determined rotational radial acceleration; and,
      determine an angular position of the rotor based at least on the adjusted tangential acceleration and the adjusted radial acceleration.

20. The wind turbine of claim 19, wherein the wind turbine control system is operable to control one or more parameters of the wind turbine based at least in part on the determined angular position of the rotor, wherein the one or more parameters comprise blade pitch, rotor position, and rotor speed.

* * * * *